United States Patent [19]

Saha et al.

[11] Patent Number: 5,104,761
[45] Date of Patent: Apr. 14, 1992

[54] INTERDISPERSED THREE-PHASE FERRITE COMPOSITE AND ELECTROGRAPHIC MAGNETIC CARIER PARTICLES THEREFROM

[75] Inventors: Bijay S. Saha; Alec N. Mutz, both of Rochester; Robert E. Zeman, Webster, all of N.Y.

[73] Assignee: Eastman Kodak Company, Rochester, N.Y.

[21] Appl. No.: 583,068

[22] Filed: Sep. 14, 1990

[51] Int. Cl.$^5$ ............................................. G03G 9/10
[52] U.S. Cl. .................................. 430/106.6; 430/108; 252/62.57
[58] Field of Search ........................... 430/108, 106.6; 252/62.57

[56] References Cited

U.S. PATENT DOCUMENTS

| | | | |
|---|---|---|---|
| 3,716,630 | 7/1970 | Shirk | 423/594 |
| 3,787,239 | 1/1974 | Schroeder et al. | 430/329 |
| 4,473,029 | 9/1984 | Fritz et al. | 118/657 |
| 4,546,060 | 10/1985 | Miskinis et al. | 430/108 |
| 4,764,445 | 8/1988 | Miskinis et al. | 430/108 |
| 4,824,587 | 4/1989 | Kwon et al. | 252/62.55 |
| 4,855,205 | 8/1989 | Saha et al. | 430/106.6 |
| 4,855,206 | 8/1989 | Saha | 430/106.6 |

OTHER PUBLICATIONS

U.S. application Ser. No. 504,824, entitled Glass Composite Magnetic Carrier Particles, filed Apr. 5, 1990.

*Primary Examiner*—Marion E. McCamish
*Assistant Examiner*—S. Rosasco
*Attorney, Agent, or Firm*—Willard G. Montgomery

[57] ABSTRACT

Disclosed is an interdispersed three-phase ferrite composite which comprises from about 0.1 mole to about 1.0 mole of a spinel phase having the general formula $MFe_2O_4$ where M is at least one element that forms a spinel ferrite and is selected from the group consisting of cobalt, manganese, iron and mixtures thereof, to about 2.5 moles of a magnetoplumbite phase having the general formula $PO.6Fe_2O_3$ where P is selected from the group consisting of strontium, barium, calcium, lead and mixtures thereof and, as a third phase, from about 0.02 to about 2.0 percent by weight, based on the combined weight of the spinel phase and the magnetoplumbite phase, of $TiO_2$ or $SiO_2$.

Also disclosed are carrier particles formed from magnetized particles of the composite which optionally can be polymerically coated, an electrostatic charged toner particles mixed with oppositely charged carrier particles formed from magnetized, and optionally polymerically coated, particles of the composite, and a method of developing an electrostatic image by contacting the image with a two-component dry developer composition described above.

19 Claims, No Drawings

INTERDISPERSED THREE-PHASE FERRITE COMPOSITE AND ELECTROGRAPHIC MAGNETIC CARIER PARTICLES THEREFROM

FIELD OF THE INVENTION

This invention relates generally to the field of electrostatography and to the development of electrostatic images. More particularly, the invention relates to hard ferrite magnetic carrier particles and developers for the dry development of electrostatic images.

BACKGROUND OF THE INVENTION

In electrography, an electrostatic charge image is formed on a dielectric surface, typically the surface of a photoconductive recording element. Development of this image is commonly achieved by contacting it with a two-component developer comprising a mixture of pigmented resinous particles (known as "toner") and magnetically attractable particles (known as "carrier"). The carrier particles serve as sites against which the non-magnetic toner particles can impinge and thereby acquire a triboelectric charge opposite to that of the electrostatic image. During contact between the electrostatic image and the developer mixture, the toner particles are stripped from the carrier particles to which they had formerly adhered (via triboelectric forces) by the relatively strong electrostatic forces associated with the charge image. In this manner, the toner particles are deposited on the electrostatic image to render it visible.

It is known in the art to apply developer compositions of the above type to electrostatic images by means of a magnetic applicator which comprises a cylindrical sleeve of non-magnetic material having a magnetic core positioned within. The core usually comprises a plurality of parallel magnetic strips which are arranged around the core surface to present alternative north and south magnetic fields. These fields project radially, through the sleeve, and serve to attract the developer composition to the sleeve's outer surface to form a brushed nap. Either or both the cylindrical sleeve and the magnetic core are rotated with respect to each other to cause the developer to advance from a supply sump to a position in which it contacts the electrostatic image to be developed. After development, the toner-depleted carrier particles are returned to the sump for toner replenishment.

Conventionally, carrier particles made of soft magnetic materials have been employed to carry and deliver the toner particles to the electrostatic image. U.S. Pat. Nos. 4,546,060 to Miskinis et al, and 4,473,029 to Fritz et al, teach the use of hard magnetic materials as carrier particles and an apparatus for the development of electrostatic images utilizing such hard magnetic carrier particles. These patents require that the carrier particles comprise a hard magnetic material exhibiting a coercivity of at least 300 Oersteds when magnetically saturated and an induced magnetic moment of at least 20 EMU/g when in an applied magnetic field of 1000 Oersteds. The terms "hard" and "soft" when referring to magnetic materials have the generally accepted meaning as indicated on page 18 of *Introduction to Magnetic Materials* by B. D. Cullity published by Addison-Wesley Publishing Company, 1972. These hard magnetic carrier materials represent a great advance over the use of soft magnetic carrier materials in that the speed of development is remarkably increased without experiencing deterioration of the image. Speeds as high as four times the maximum speed utilized in the use of soft magnetic carrier particles have been demonstrated.

The above two mentioned U.S. patents, while generic to all hard magnetic materials having the properties set forth, prefer the hard magnetic ferrites which are compounds of barium and/or strontium such as, $BaFe_{12}O_{19}$, $SrFe_{12}O_{19}$ and the magnetic ferrites having the formula $MO.6Fe_2O_3$, where M is barium, strontium or lead as disclosed in U.S. Pat. No. 3,716,630.

In copending U.S. application Ser. No. 561,382, entitled "Interdispersed Two-Phase Ferrite Composite and Electrographic Magnetic Carrier Particles Therefrom", filed Aug. 1, 1990, which is incorporated herein by reference, it is disclosed that the properties of the hard ferrite magnetic carrier particles described in aforementioned U.S. Pat. No. 4,546,060 and U.S. Pat. No. 4,473,029 can be improved by the addition of cobalt, manganese or iron to the particles. As described therein, it was found that the addition of cobalt, manganese or iron to the hard ferrite magnetic particles, results in the formation of a two-phase composite structure which has a magnetic moment that is higher than the magnetic moment of the corresponding hard ferrite magnetic material by itself exclusive of the added cobalt, manganese or iron. This results in a higher rate of flow of developer compositions comprising mixtures of charged toner particles and oppositely charged carrier particles prepared from the two-phase composite materials around the shell of a rotating-core magnetic applicator used to develop electrostatic images of the type disclosed and described in previously mentioned U.S. Pat. Nos. 4,547,060 and 4,473,029. This in turn results in higher development speeds which means that more copies can be produced per unit time.

In addition to facilitating the rapid flow of developer smoothly around the shell of the rotating-core magnetic applicator, the increase in magnetic moment provided by the two-phase composite materials described in aforementioned copending U.S. application Ser. No. 561,382, entitled "Interdispersed Two-Phase Ferrite Composite and Electrographic Magnetic Carrier Particles Therefrom", filed Aug. 1, 1990, results in an increased magnetic attraction between the rotating-core magnetic applicator and magnetic carrier particles formed from the material. This causes the carrier particles to be held more tightly or securely to the applicator shell during core rotation and development which prevents the carrier particles from transferring to and being picked-up by the recording element during development. The transfer of carrier particles from the applicator shell to the image being developed (i.e., "carrier pick-up") is to be avoided because carrier particles which are picked-up by the insulating surface in the toning operation have the effect at toner transfer of holding areas of the transfer surface away from the insulating surface thereby inhibiting toner powder transfer which causes image artifacts such as streaking and "tent-poling" in the transferred, developed and fixed images produced in the copying operation. The occurrence of carrier pick-up is frequently encountered when very small carrier particles, called "fines", are present in the developer composition. These particles, which typically have a particle size of approximately 10 micrometers or less, and more typically 0.1 to 5.0 micrometers, also have significantly lower or weaker magnetic moments due to their smaller particle size than those possessed by larger-sized carrier particles of the same or identical material (i.e., 10 micrometers or greater). "Particle size" as used herein refers to the "average diameters" of the particles. The average diameters of the particles herein are diameters of median particles by volume, i.e., 50 percent of the total volume of the particles is made up of particles that each have a diameter greater than the reported value and 50 percent of the total volume of the particles is made up of particles that each have a diameter less than the reported value. Thus, the ranges for the diameters of the particles in the total volume are reported herein. Because of their extremely small size and hence low magnetic moments, the magnetic attraction between the applicator shell and at least a portion of the small carrier particle fines is insufficient to hold the very small carrier particles on the applicator shell or sleeve during core-rotation and development with the result that the carrier particles tend to migrate readily and freely onto the recording element during development. It is reported in previously mentioned copending U.S. application Ser. No. 561,382, entitled "Interdispersed Two-Phase Ferrite Composite and Electrographic Magnetic Carrier Particles Therefrom", filed Aug. 1, 1990, however, that carrier pick-up can be ameliorated or reduced by as much as 80%, typically 75% to 80%, by utilizing developer compositions containing carrier particles prepared from the two-phase composite materials described therein in the development of electrostatic images in an electrostatographic development apparatus of the type disclosed and described in U.S. Pat. Nos. 4,564,060 and 4,473,029 as compared to developer compositions otherwise identical in makeup except for containing the aforedescribed hard ferrite magnetic carrier particles of the prior art devoid of added cobalt, manganese or iron in place of the two-phase composite carrier particles even-in developer compositions containing carrier particle fines having diameters of 10 micrometers or less.

Of further significance, it is also reported therein that magnetic carrier particles made from such two-phase composite materials have a high coercivity, i.e., at least 300 Oersteds and, typically, about 1000 to 3000 Oersteds when magnetically saturated. A high coercivity is important as it results in better carrier flow, which means that the carrier particles flip 180° on the brush of the rotating-core applicator rather than sliding along the core of the brush which in turn results in a higher charge on the toner and more delivery of the toner to the photoconductor. This is discussed more fully in aforementioned U.S. Pat. No. 4,546,060 and in U.S. Pat. No. 4,855,205 to Saha et al. While these interdispersed two-phase ferrite materials provide for improved carrier particles having an enhanced magnetic moment, the addition of cobalt, manganese or iron to the hard ferrite magnetic carrier particles described in aforementioned U.S. Pat. Nos. 4,546,060 and 4,473,029 typically has been found to cause a reduction in the coercivity of such particles such that the coercivity of the resultant interdispersed two-phase carrier particles usually is somewhat less than that of the corresponding hard ferrite magnetic carrier particles devoid of the added cobalt, manganese or iron. Thus, while the addition of cobalt, manganese or iron on the one hand serves to increase the magnetic moment of the corresponding hard ferrite magnetic carrier particles without the added cobalt, manganese or iron, it also serves, unfortunately, on the other hand, to effectively reduce the coercivity of the hard ferrite magnetic carrier particles. This is undesirable since, as previously discussed, a high coercivity is important as it results in better carrier flow which in turn results in a higher charge on the toner and more delivery of the toner to the photoconductor. Accordingly, it would be highly desirable to be able to further improve the interdispersed two-phase magnetic carrier particles described above by enhancing the coercivity of such particles without effecting (i.e., lowering) the high magnetic moment of the particles so that carrier particles possessing both an enhanced magnetic moment essential to the attainment of high development speeds and an enhanced coercivity essential to the attainment of smooth carrier flow around the shell of the rotating-core magnetic applicator are provided to the art.

SUMMARY OF THE INVENTION

We have now discovered that the properties of interdispersed two-phase ferrite magnetic composite carrier materials can be further improved by the addition of $TiO_2$ or $SiO_2$ to the composite material. Specifically, we have found that the addition of $TiO_2$ or $SiO_2$ to the interdispersed two-phase ferrite magnetic composite material results in the formation of an interdispersed three-phase ferrite composite material which has a coercivity higher than the coercivity of the corresponding two-phase hard ferrite magnetic material by itself without the addition of $TiO_2$ or $SiO_2$. This is important since, as discussed previously, a higher coercivity results in better carrier flow around the shell of the rotating-core magnetic developer which in turn results in higher toner charge and more delivery of the toner to the surface of the recording element. In addition, we also have found that the addition of $TiO_2$ or $SiO_2$ to the two-phase composite material not only increases the coercivity of the material itself, but does so without lowering the induced magnetic moment of the material so that developer compositions comprising mixtures of charged toner particles and oppositely charged magnetic carrier particles made from the three-phase ferrite composite materials of the present invention display or exhibit the same high rate of developer flow around the shell of the rotating-core magnetic applicator as do those comprising mixtures of charged toner particles and oppositely charged carrier particles made from the interdispersed two-phase ferrite materials so that the same high development speeds are provided by the developers of the present invention as are provided by those developers comprising the previously used interdispersed two-phase ferrite magnetic carrier particles.

Still further, because of the high magnetic moment provided by the three-phase composite materials of the present invention, there is afforded a magnetic attraction between the rotating-core applicator and the carrier particles formed from the composite materials of the invention sufficient enough to hold the carrier particles securely to the applicator shell during core rotation and development so that unwanted carrier pick-up (i.e., the transfer of carrier particles from the applicator to the recording element during development is prevented.

Accordingly, there is now provided an interdispersed three-phase ferrite composite which comprises from about 0.1 mole to about 1.0 mole of a spinel phase having the general formula $MFe_2O_4$ where M is at least one element that forms a spinel ferrite and is selected from the group consisting of cobalt, manganese, iron and mixtures thereof, to about 2.5 moles of a magnetoplumbite phase having the general formula $PO.6Fe_2O_3$ where P is selected from the group consisting of strontium, barium, calcium, lead and mixtures thereof and, as a third phase, from about 0.02 to about 2.0 percent by weight, based on the combined weight of the spinel phase and the magnetoplumbite phase, of $TiO_2$ or $SiO_2$.

Also provided are carrier particles for use in the development of electrostatic images which comprise a hard magnetic interdispersed three-phase ferrite composite comprising from about 0.1 mole to about 1.0 mole of a spinel phase having the general formula $MFe_2O_4$ wherein M is at least one element that forms a spinel ferrite and is selected from the group consisting of cobalt, manganese, iron and mixtures thereof, to about 2.5 moles of a magnetoplumbite phase having the general formula $PO.6Fe_2O_3$ where P is selected from the group consisting of strontium, barium, calcium, lead and mixtures thereof and, as a third phase, from about 0.02 to about 2.0 percent by weight, based on the combined weight of the spinel phase and the magnetoplumbite phase, of $TiO_2$ or $SiO_2$.

Further provided are two-component dry electrostatic developers for use in the development of electrostatic images which comprise a mixture of charged toner particles and oppositely charged carrier particles comprising a hard magnetic interdispersed three-phase ferrite composite comprising from about 0.1 mole to about 1.0 mole of a spinel phase having the general formula $MFe_2O_4$ wherein M is at least one element that forms a spinel ferrite and is selected from the group consisting of cobalt, manganese, iron and mixtures thereof to about 2.5 moles of a magnetoplumbite phase having the general formula $PO.6Fe_2O_3$ where P is selected from the group consisting of strontium, barium, calcium, lead and mixtures thereof and, as a third phase, from about 0.02 to about 2.0 percent by weight, based on the combined weight of the spinel phase and the magnetoplumbite phase, of $TiO_2$ or $SiO_2$.

Still further, there is provided a method of developing an electrostatic image on a surface which comprises contacting the image with a two-component dry electrostatographic developer composition which comprises a mixture of charged toner particles and oppositely charged carrier particles comprising a hard magnetic interdispersed three-phase ferrite composite comprising from about 0.1 mole to about 1.0 mole of a spinel phase having the general formula $MFe_2O_4$ wherein M is at least one element that forms a spinel ferrite and is selected from the group consisting of cobalt, manganese, iron and mixtures thereof to about 2.5 moles of a magnetoplumbite phase having the general formula $PO.6Fe_2O_3$ where P is selected from the group consisting of strontium, barium, calcium, lead and mixtures thereof and, as a third phase, from about 0.02 to about 2.0 percent by weight, based on the combined weight of the spinel phase and the magnetoplumbite phase, of $TiO_2$ or $SiO_2$.

DETAILED DESCRIPTION OF THE INVENTION

The carrier particles of this invention comprise a homogeneous mixture of three separate phases, the first phase is a spinel or "S" phase which has a cubic crystal structure and can be represented by the general formula $MFe_2O_4$ where M is at least one element that forms a spinel ferrite and is selected from the group consisting of cobalt, manganese, iron and mixtures thereof. (When iron is used, the ferrite has the formula $Fe_3O_4$).

The second phase is a magnetoplumbite phase or "M" phase which has a hexagonal crystal structure. The "M" phase has the general formula $PO.6Fe_2O_3$. In that formula, P is strontium, barium, calcium, lead or mixtures thereof. Of these four elements, strontium is the most preferred because it is less toxic and more commercially accepted.

The third phase consists of either titanium dioxide or silicon dioxide wherein the titanium dioxide or silicon dioxide constitutes from 0.02 to 2.0 percent by weight, and preferably from 0.05 to 1.0 percent by weight, of the combined weight of the spinel phase and the magnetoplumbite phase.

X-ray diffraction studies have indicated that three separate phases are present in the composition consisting of an "M" phase, an "S" phase and a third phase of $TiO_2$ or $SiO_2$ which are interdispersed or homogeneously mixed and that no cross reaction has occurred between the three phases or among the various chemical species.

The composites of this invention can be prepared by conventional procedures that are well known in the art of making ferrites. Suitable procedures are described, for example, in U.S. Pat. Nos. 3,716,630, 4,623,603, and 4,042,518; European Patent Application 0 086 445; "Spray Drying" by K. Masters, published by Leonard Hill Books London, pages 502–509 and "Ferromagnetic Materials," Volume 3 edited E. P. Wohlfarth, and published by North Holland Publishing Company, Amsterdam, N.Y., page 315 et seq. Briefly, a typical preparation procedure might consist of mixing oxides or carbonates of the elements in the appropriate proportion with an organic binder and water and spray-drying the mixture to form a fine dry particulate. The particulate then can be fired between about 900° C. and 1300° C. for approximately 15 to 20 hours which produces the ferrite composite. The composite is magnetized and is typically coated with a polymer, as is well known in the art, to better enable the carrier particles to triboelectrically charge the toner particles. The layer of resin on the carrier particles should be thin enough so that the mass of particles remains conductive. Preferably the resin layer is discontinuous so that spots of bare ferrite on each particle provide conductive contact. The carrier particles can be passed through a sieve to obtain the desired range of sizes. A typical particle size, including the polymer coating, is about 5 to about 60 micrometers, but smaller sized carrier particles, about 10 to about 30 micrometers, are preferred as they produce a better quality image.

The composite ferrite carrier particles of this invention exhibit a high coercivity of at least 300 Oersteds, typically about 1000 to 3000 Oersteds, when magnetically saturated and an induced magnetic moment of at least 20 EMU/g of carrier in an applied field of 1000 Oersteds. Preferred particles have an induced magnetic moment of about 30 to about 70 EMU/g of carrier in an applied field of 1000 Oersteds. As mentioned previously, a high coercivity is desirable as it results in better carrier flow on the brush, which results in a higher charge on the toner and more delivery of the toner to the photoconductor, which in turn translates into higher development speeds.

The coercivity of a magnetic material refers to the minimum external magnetic force necessary to reduce the induced magnetic moment from the remanence value to zero while it is held stationary in the external field and after the material has been magnetically saturated, i.e., the material has been permanently magnetized. A variety of apparatus and methods for the measurement of coercivity of the present carrier particles can be employed, such as a Princeton Applied Research Model 155 Vibrating Sample Magnetometer, available from Princeton Applied Research Co., Princeton, N.J. The powder is mixed with a nonmagnetic polymer powder (90% magnetic powder: 10% polymer by weight). The mixture is placed in a capillary tube, heated above the melting point of the polymer, and then allowed to cool to room temperature. The filled capillary tube is then placed in the sample holder of the magnetometer and a magnetic hysteresis loop of external field (in Oersteds) versus induced magnetism (in EMU/g) is plotted. During this measurement, the sample is exposed to an external field of 0 to 10,000 Oersteds.

The present invention contemplates the fact that by incorporating $TiO_2$ or $SiO_2$ into the crystallographic structure of an interdispersed two-phase ferrite composite material of the kind described in previously mentioned copending U.S. application Ser. No. 561,382, entitled "Interdispersed Two-Phase Ferrite Composite and Electrographic Magnetic Carrier Particles Therefrom", filed Aug. 1, 1990, that the coercivity of the resultant interdispersed three-phase ferrite composite will be higher than the coercivity of the corresponding two-phase ferrite composite by itself without the added $TiO_2$ or $SiO_2$ and further that the induced magnetic moment of the resultant interdispersed three-phase ferrite composite will be the same or substantially the same as that of the corresponding interdispersed two-phase ferrite composite without the added $TiO_2$ or $SiO_2$. For example, we have found that the coercivity of a composite carrier particle of the invention comprising a spinel or "S" phase of $CoFe_2O_4$ and a magnetoplumbite or "M" phase of $SrFe_{12}O_{19}$ in a mole ratio of 0.6:2.5 containing 1.0 percent by weight $TiO_2$ based on the combined weight of the "M" phase and the "S" phase was 1871 Oersteds while the coercivity of a corresponding carrier particle consisting only of the "M" and "S" phases alone in the same molar ratio without the $TiO_2$ was only 1610 Oersteds. We also found, however, that the magnetic moments of both the interdispersed three-phase ferrite composite carrier particles and the interdispersed two-phase ferrite composite carrier particles were the same, i.e., 62.4 EMU/g of carrier particle.

The induced magnetic moment of the composite carriers of the present invention in a 1000 Oersted applied field is dependent chiefly on the composition and concentration of the magnetic material in the particle. We have found that it is important that the molar ratio of the spinel or "S" phase ($MFe_2O_4$) to the magnetoplumbite or "M" phase ($PO.6Fe_2O_3$) be closely maintained at approximately 0.1 mole to 1 mole of the spinel phase to approximately 2.5 moles of the magnetoplumbite phase since concentrations of a spinel phase in the composite carrier particles in excess of about 1 mole of the spinel phase to approximately 2.5 moles of the "M" phase, while increasing the magnetic moment of the composite particles, also tends to reduce the coercivity of the composite particles. This results in poor carrier flow on the magnetic brush. Conversely, if the concentration of the spinel phase present in the composite carrier particle falls much below the minimum aforestated amount, a reduction in the saturation magnetic moment of the particles results. This in turn results in a reduction in the rate of carrier flow over the applicator shell and unacceptably high carrier pick-up.

It is equally important that the amount of $TiO_2$ or $SiO_2$ present in the composite materials of the present invention be maintained at the specified range since the presence of $TiO_2$ or $SiO_2$ in the interdispersed three-phase ferrite composite materials of the present invention in amounts in excess of about 2.0 percent by weight based on the combined weight of the "M" and "S" phases results in a reduction in the saturation magnetic moment of the material, while the presence of $TiO_2$ or $SiO_2$ in the composite materials of the present invention in amounts less than about 0.02 percent by weight based on the combined weight of the "M" and "S" phases produces very little or no change in the coercivity of the material.

The novel developers of present invention comprise two alternative types of carrier particles. The first of these carriers comprises a binder-free magnetic particulate material exhibiting the requisite coercivity and induced magnetic moment. This type is preferred.

In the second developer, each carrier particle is heterogeneous and comprises a composite of a binder and a magnetic material exhibiting the requisite coercivity and induced magnetic moment. The magnetic material is dispersed as discrete smaller particles throughout the binder; that is, each composite carrier particle comprises a discontinuous particulate magnetic material phase of the requisite coercivity in a continuous binder phase.

The individual bits of the magnetic material should preferably be of a relatively uniform size and sufficiently smaller in diameter than the composite carrier particle to be produced. Typically, the average diameter of the magnetic material should be no more than about 20 percent of the average diameter of the carrier particle. Advantageously, a much lower ratio of average diameter of magnetic component to carrier can be used. Excellent results are obtained with magnetic powders of the order of 5 micrometers down to 0.05 micrometer average diameter. Even finer powders can be used when the degree of subdivision does not produce unwanted modifications in the magnetic properties and the amount and character of the selected binder produce satisfactory strength, together with other desirable mechanical and electrical properties in the resulting carrier particle.

The concentration of the magnetic material can vary widely. Proportions of finely divided magnetic material, from about 20 percent by weight to about 90 percent by weight of composite carrier, can be used.

As mentioned previously, the induced magnetic moment of composite carriers in a 1000 Oersted applied field is dependent chiefly on the composition and concentration of the magnetic material in the particle. It will be appreciated, therefore, that the induced moment of the magnetic material should be sufficiently greater than 20 EMU/g to compensate for the effect upon such induced moment from dilution of the magnetic material in the binder. For example, one might find that, for a concentration of 50 weight percent magnetic material in the composite particles, the 1000 Oersted induced magnetic moment of the magnetic material should be at least 40 EMU/g to achieve the minimum level of 20 EMU/g for the composite particles.

The binder material used with the finely divided magnetic material is selected to provide the required mechanical and electrical properties. It should (1) adhere well to the magnetic material, (2) facilitate the formation of strong, smooth-surfaced particles and (3) preferably possess sufficient difference in triboelectric properties from the toner particles with which it will be used to insure the proper polarity and magnitude of electrostatic charge between the toner and carrier when the two are mixed.

The matrix can be organic, or inorganic, such as a matrix composed of glass, metal, silicone resin or the like. Preferably, an organic material is used such as a natural or synthetic polymeric resin or a mixture of such resins having appropriate mechanical properties. Appropriate monomers (which can be used to prepare resins for this use) include, for example, vinyl monomers such as alkyl acrylates, and methacrylates, styrene and substituted styrenes, basic monomers such as vinyl pyridines, etc. Copolymers prepared with these and other vinyl monomers such as acidic monomers, e.g., acrylic or methacrylic acid, can be used. Such copolymers can advantageously contain small amounts of polyfunctional monomers such as divinylbenzene, glycol dimethylacrylate, triallyl citrate and the like. Condensation polymers such as polyesters, polyamides or polycarbonates also can be employed.

Preparation of composite carrier particles according to this invention may involve the application of heat to soften thermoplastic material or to harden thermosetting material; evaporative drying to remove liquid vehicle; the use of pressure, or of heat and pressure, in molding, casting, extruding, etc., and in cutting or shearing to shape the carrier particles; grinding, e.g., in ball mill to reduce carrier material to appropriate particle size; and sifting operations to classify the particles.

According to one preparation technique, the powdered magnetic material is dispersed in a solution of the binder resin. The solvent may then be evaporated and the resulting solid mass subdivided by grinding and screening to produce carrier particles of appropriate size.

According to another technique, emulsion or suspension polymerization is used to produce uniform carrier particles of excellent smoothness and useful life.

As discussed previously, carrier particles of the invention are employed in combination with toner particles to form a dry, two-component composition. In use, the toner particles are electrostatically attracted to the electrostatic charge pattern on an element while the carrier particles remain on the applicator shell. This is accomplished in part by intermixing the toner and carrier particles so that the carrier particles acquire a charge of one polarity and the toner particles acquire a charge of the opposite polarity. The charge polarity on the carrier is such that it will not be electrically attracted to the electrostatic charge pattern. The carrier particles are also prevented from depositing on the electrostatic charge pattern because the magnetic attraction exerted between the rotating core and the carrier particles exceeds the electrostatic attraction, which may arise between the carrier particles and the charge image.

Tribocharging of toner and hard magnetic carrier is achieved by selecting materials that are so positioned in the triboelectric series to give the desired polarity and magnitude of charge when the toner and carrier particles intermix. If the carrier particles do not charge as desired with the toner employed, moreover, the carrier can be coated with a material which does. Such coating can be applied to either composite or binder-free particles as described herein. The polarity of the toner charge, moreover, can be either positive or negative.

Various resin materials can be employed as a coating on the hard magnetic carrier particles. Examples include those described in U.S. Pat. Nos. 3,795,617, to J. McCabe; 3,795,618, to G. Kasper and 4,076,857 to G. Kasper. The choice of resin will depend upon its triboelectric relationship with the intended toner. For use with toners which are desired to be positively charged, preferred resins for the carrier coating include fluorocarbon polymers such as poly(tetrafluoroethylene); poly(vinylidene fluoride) and poly(vinylidene fluoride-co-tetrafluoroethylene).

The carrier particles can be coated with a tribocharging resin by a variety of techniques such as solvent coating, spray application, plating, tumbling or melt coating. In melt coating, a dry mixture of hard magnetic particles with a small amount of powdered resin, e.g., 0.05 to 5.0 weight percent resin is formed, and the mixture heated to fuse the resin. Such a low concentration of resin will form a thin or discontinuous layer of resin on the carrier particles.

The developer is formed by mixing the particles with toner particles in a suitable concentration. Within developers of the invention, high concentrations of toner can be employed. Accordingly, the present developer preferably contains from about 70 to 99 weight percent carrier and about 30 to 1 weight percent toner based on the total weight of the developer; most preferably, such concentration is from about 75 to 99 weight percent carrier and from about 25 to 1 weight percent toner.

The toner component of the invention can be a powdered resin which is optionally colored. It normally is prepared by compounding a resin with a colorant, i.e., a dye or pigment, and any other desired addenda. If a developed image of low opacity is desired, no colorant need be added. Normally, however, a colorant is included and it can, in principle be any of the materials mentioned in Colour Index, Vols. I and II, 2nd Edition. Carbon black is especially useful. The amount of colorant can vary over a wide range, e.g., from 3 to 20 weight percent of the polymer. Combinations of colorants may be used.

The mixture is heated and milled to disperse the colorant and other addenda in the resin. The mass is cooled, crushed into lumps and finely ground. The resulting toner particles range in diameter from 0.5 to 25 micrometers with an average size of 1 to 16 micrometers. Preferably, the average particle size ratio of carrier to toner lies within the range from about 15:1 to about 1:1. However, carrier-to-toner average particle size ratios of as high as 50:1 are also useful.

The toner resin can be selected from a wide variety of materials, including both natural and synthetic resins and modified natural resin, as disclosed, for example, in the patent to Kasper et al, U.S. Pat. No. 4,076,857. Especially useful are the crosslinked polymers disclosed in the patent to Jadwin et al, U.S. Pat. No. 3,938,992, and the patent to Sadamatsu et al, U.S. Pat. No. 3,941,898. The crosslinked or non-crosslinked copolymers of styrene or lower alkyl styrenes with acrylic monomers such as alkyl acrylates or methacrylates are particularly useful. Also useful are condensation polymers such as polyesters.

The shape of the toner can be irregular, as in the case of ground toners, or spherical. Spherical particles are obtained by spray-drying a solution of the toner resin in a solvent. Alternatively, spherical particles can be prepared by the polymer bead swelling technique disclosed in European Patent No. 3,905, published Sept. 5, 1979, to J. Ugelstad.

The toner also can contain minor components such as charge control agents and antiblocking agents. Especially useful charge control agents are disclosed in U.S. Pat. No. 3,893,935 and British Patent No. 1,501,065. Quaternary ammonium salt charge agents as disclosed in Research Disclosure, No. 21030, Volume 210, October, 1981 (published by Industrial Opportunities Ltd., Homewell, Havant, Hampshire, P09 1EF, United Kingdom), also are useful.

In the method of the present invention, an electrostatic image is brought into contact with a magnetic brush comprising a rotating-magnetic core, an outer non-magnetic shell and the two-component, dry developer described above. The electrostatic image so developed can be formed by a number of methods such as by imagewise photodecay of a photoreceptor, or imagewise application of a charge pattern on the surface of a dielectric recording element. When photoreceptors are employed, such as in high-speed electrophotographic copy devices, the use of halftone screening to modify an electrostatic image can be employed, the combination of screening with development in accordance with the method for the present invention producing high-quality images exhibiting high $D_{max}$ and excellent tonal range. Representative screening methods including those employing photoreceptors with integral half-tone screens are disclosed in U.S. Pat. No. 4,385,823.

The invention is further illustrated by the following examples.

EXAMPLE 1

Powders of strontium carbonate, iron oxide, cobalt oxide and $TiO_2$ in the necessary proportions were weighed and mixed thoroughly. In a separate container, a stock solution was prepared by dissolving 4 weight percent (based on stock solution weight) of a binder resin and 0.4 weight percent ammonium polymethacrylate surfactant (sold by W. R. Grace and Co. as "Daxad-32") in distilled water. The powders were mixed with the stock solution in a 50:50 weight ratio and the mixture was ball milled for about 24 hours then spray dried. The green bead particles thus formed were classified to obtain a suitable particle size distribution. The green bead was then fired at a temperature of approximately 1175° C. for 15 to 20 hours. The fired cake, thus obtained, was deagglomerated and the powder was sieved to be used as carrier. The resulting carriers had a three-phase composite structure with a spinel phase consisting of $CoFe_2O_4$, an "M" phase consisting of $SrFe_{12}O_{19}$ and a third phase consisting of $TiO_2$. The mole ratio of the "M" phase to the "S" phase was 2.5:0.6 and the composite contained 1.0 wt. % $TiO_2$ based on the combined weight of the "M" phase and the "S" phase. (A higher ratio of the "S" phase can be obtained utilizing the same procedure along with a variable mole ratio, other than 2.5, of the "M" phase).

The sample was subjected to a vibrating sample magnometer test along with a control carrier core consisting only of the "M" and "S" phases in the same molar ratio set forth above. The results of the test are shown in Table 1.

TABLE 1

| Spinel Phase | Magnetization (EMU/g) | Coercivity (Oersteds) |
|---|---|---|
| Control | 62.4 | 1610 |
| Example 1 | 62.4 | 1871 |

The above table shows that the coercivity of the interdispersed three-phase ferrite composite carrier of the invention was significantly higher than that of the corresponding interdispersed two-phase ferrite control carrier devoid of $TiO_2$ and that the magnetization (i.e., the magnetic moment) of the interdispersed three-phase ferrite carrier of the invention was the same as that of the control carrier.

EXAMPLE 2

The procedure of Example 1 was repeated except that $SiO_2$ was substituted for $TiO_2$ to form carrier particles having an interdispersed three-phase composite structure with a spinel phase consisting of $CoFe_2O_4$ and an "M" phase consisting of $SrFe_{12}O_{19}$ and a third phase consisting of $SiO_2$. The mole ratio of the "M" phase to the "S" phase was 2.5:0.6 and the composite structure contained 1.0 wt % $SiO_2$ based on the combined weight of the "M" phase and the "S" phase.

The sample was subjected to a vibrating sample magnometer test along with a control carrier core consisting only of the "M" and "S" phases in the same molar ratio as before, i.e., 2.5:0.6.

The results of the test are shown in Table 2.

TABLE 2

| Spinel Phase | Magnetization (EMU/g) | Coercivity (Oersteds) |
|---|---|---|
| Control | 62.4 | 1610 |
| Example 2 | 62.4 | 1875 |

The above table shows that the coercivity of the interdispersed three-phase ferrite composite carrier of the invention was significantly higher than that of the corresponding interdispersed two-phase ferrite control carrier containing no $SiO_2$ and that the magnetization (i.e., the magnetic moment) of the interdispersed three-phase ferrite carrier of the invention was the same as that of the control carrier.

Examples 1 and 2 can be repeated using interdispersed three-phase ferrite composite carriers comprising a magnetoplumbite phase containing barium, calcium or lead and a spinel phase containing cobalt, manganese or iron with comparable results.

"Electrography" and "electrographic" as used herein are broad terms which include image-forming processes involving the development of an electrostatic charge pattern formed on a surface with or without light exposure, and thus includes electrophotography and other processes.

The composite particles of this invention are useful as carriers and in making toners and developers for use in any electrostatographic process, including electrophotographic processes where the electrostatic charge on the photoconductor is induced by light, and dielectric recording processes, where the electrostatic charge on the photoconductor is induced electronically. The particles can be used as part of a single component toner, and as part of a two-component developer where they provide a magnetically readable image. They can also be used as cleaning particles in a magnetic brush cleaning station. They are also useful in making soft and hard sintered magnets because the saturation magnetic moment and the coercivity can be independently controlled, and a smooth particle surface is produced.

The invention has been described in detail with particular reference to preferred embodiments thereof, but it will be understood that variations and modifications can be effected within the spirit and scope of the invention.

We claim:

1. An interdispersed three-phase ferrite composite which comprises about 0.1 mole to about 1.0 mole of a spinel phase having the general formula $MFe_2O_4$ where M is at least one element that forms a spinel ferrite selected from the group consisting of cobalt, manganese, iron and mixtures thereof, to about 2.5 moles of a magnetoplumbite phase having the general formula $PO.6Fe_2O_3$, where P is selected from group consisting of strontium, barium, calcium, lead and mixtures thereof and, as a third phase, from about 0.02 to about 2.0 percent by weight, based on the combined weight of the spinel phase and the magnetoplumbite phase, of $TiO_2$ or $SiO_2$.

2. A composite according to claim 1, wherein M is cobalt.

3. A composite according to claim 1, wherein M is manganese.

4. A composite according to claim 1, wherein M is iron.

5. A composite according to claim 1, wherein P is strontium.

6. A particle formed of a composite according to claim 1.

7. A particle according to claim 6, which is generally spherical.

8. A carrier for use in the development of electrostatic images comprising magnetized particles according to claim 6.

9. A developer comprising about 75 to about 99 weight percent of a carrier according to claim 8, and about 1 to about 25 weight percent of a toner.

10. A method of developing an electrostatic image comprising contacting the image with a two-component dry developer composition of claim 9.

11. A carrier for use in the development of electrostatic images comprising particles according to claim 6, magnetized and coated with a polymer.

12. A carrier for use in the development of electrostatic images according to claim 11, having a particle size of about 5 to about 60 micrometers in diameter.

13. A carrier for use in the development of electrostatic images according to claim 12, having a particle size of about 10 to about 30 micrometers in diameter.

14. Carrier particles for use in the development of electrostatic images which comprise a hard magnetic interdispersed three-phase ferrite composite comprising from about 0.1 mole to about 1.0 mole of a spinel phase having the general formula $MFe_2O_4$ where M is at least one element that forms a spinel ferrite selected from the group consisting of cobalt, manganese, iron and mixtures thereof, to about 2.5 moles of a magnetoplumbite phase having the general formula $PO.6Fe_2O_3$, where P is selected from the group consisting of strontium, barium, calcium, lead and mixtures thereof and, as a third phase, from about 0.02 to about 2.0 percent by weight, based on the combined weight of the spinel phase and the magnetoplumbite phase, of $TiO_2$ or $SiO_2$.

15. The carrier particles of claim 4 exhibiting a coercivity of at least 300 Oersteds when magnetically saturated and an induced magnetic moment of at least 20 EMU/g of carrier in an applied field of 1000 Oersteds.

16. An electrostatic two-component dry developer composition for use in the development of electrostatic images which comprises a mixture of charged toner particles and oppositely charge carrier particles which comprise a hard magnetic interdisposed three-phase ferrite composite comprising from about 0.1 mole to about 1.0 mole of a spinel phase having the general formula $MFe_2O_4$, where M is at least one element that forms a spinel ferrite selected from the group consisting of cobalt, manganese, iron and mixtures thereof, to about 2.5 moles of a magnetoplumbite phase having the general formula $PO.6Fe_2O_3$, where P is selected from the group consisting of strontium, barium, calcium, lead and mixtures thereof and, as a third phase, from about 0.02 to about 2.0 percent by weight, based on combined weight of the spinel phase and the magnetoplumbite phase, of $TiO_2$ or $SiO_2$.

17. The composition according to claim 16, wherein the carrier particles exhibit a coercivity of at least 300 Oersteds when magnetically saturated and an induced magnetic moment of at least 20 EMU/g of carrier in an applied field of 1000 Oersteds.

18. A method of developing an electrostatic image comprising contacting the image with a two-component dry developer composition of claim 17.

19. A method of developing an electrostatic image comprising contacting the image with a two-component dry developer composition of claim 16.

* * * * *

UNITED STATES PATENT AND TRADEMARK OFFICE
CERTIFICATE OF CORRECTION

PATENT NO. : 5,104,761
DATED : April 14, 1992
INVENTOR(S) : Bijay S. Saha, Alec N. Mutz and Robert E. Zeman It is certified that error appears in the above-identified patent and that said Letters Patent is hereby corrected as shown below:

Title page:

At [54], "INTERDISPERSED THREE-PHASE FERRITE COMPOSITE AND ELECTROGRAPHIC MAGNETIC CARIER PARTICLES THEREFROM" should read --INTERDISPERSED THREE-PHASE FERRITE COMPOSITE AND ELECTROGRAPHIC MAGNETIC CARRIER PARTICLES THEREFROM--

Signed and Sealed this

Seventeenth Day of August, 1993

Attest:

BRUCE LEHMAN

*Attesting Officer*   *Commissioner of Patents and Trademarks*